Nov. 15, 1960     E. P. LE MAY     2,959,884
FISHING LINE RELEASES FOR ATTACHMENT TO FISHING BOATS
Filed Aug. 26, 1957
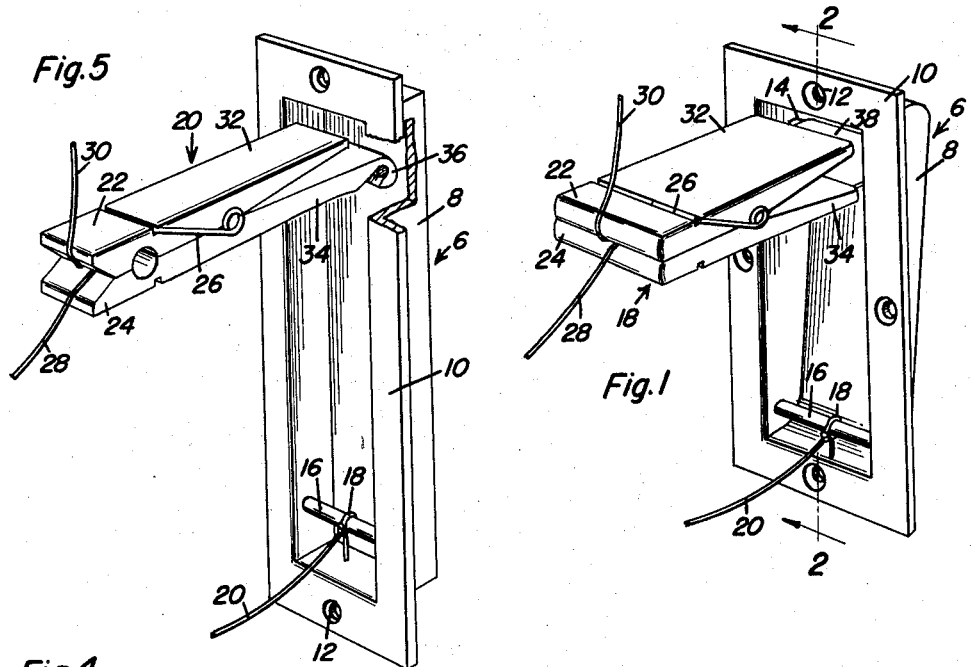
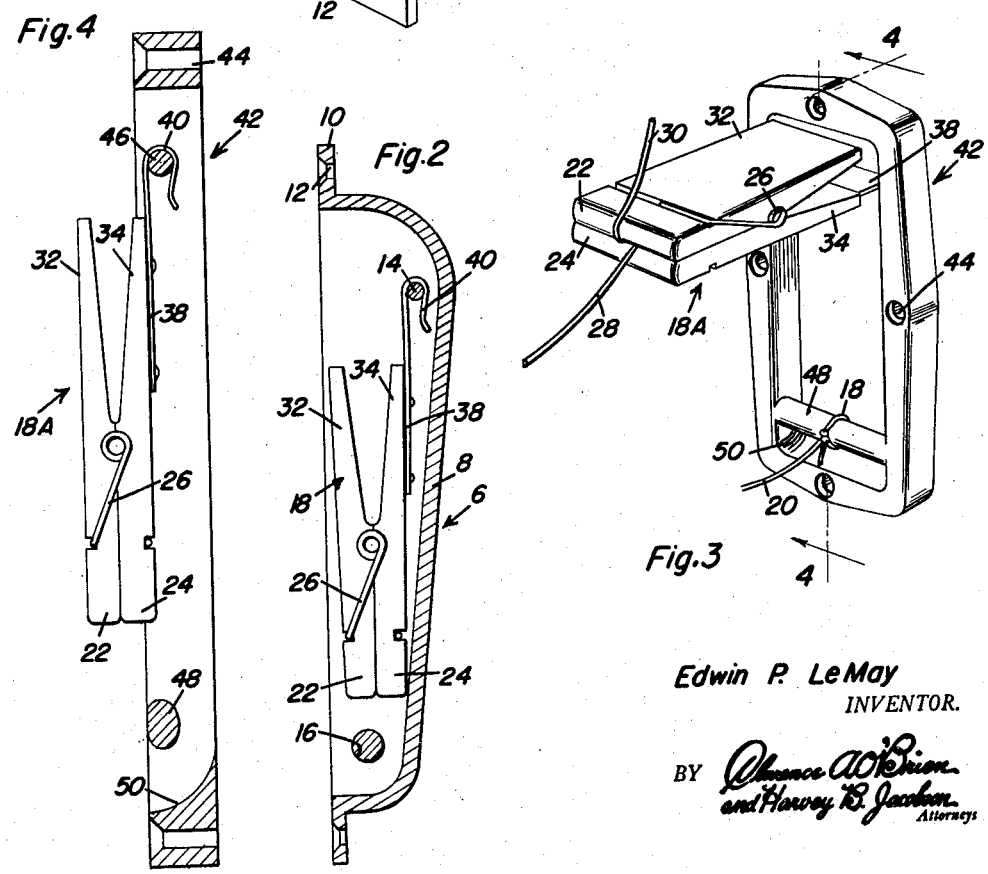
Edwin P. LeMay
INVENTOR.

2,959,884

FISHING LINE RELEASES FOR ATTACHMENT TO FISHING BOATS

Edwin P. LeMay, 530 Biscayne Blvd., Miami 32, Fla.

Filed Aug. 26, 1957, Ser. No. 680,321

6 Claims. (Cl. 43—43.12)

The present invention relates to a simple, practical and economical release for a fishing line, on the one hand, and a teaser-line on the other hand, the same being adapted for use on commercial fishing boats as well as on other types of boats for sport fishing.

The object of the invention is to temporarily and releasably hold a fishing line so that it will not run off the fishing reel, making it possible to leave the reel drag in an off position with the clicker on or off. The device is characterized by specially constructed tension and pull released line holding clip having desired spring pressed jaws for releasable retention of a predetermined portion of the line so that when the fish strikes and jerks the line from between the jaws the desired drop-back action is had and highly satisfactory results are assured.

The invention disclosed is carried out by way of two embodiments which are basically the same in that each is characterized by a bracket or fixture having upper and lower pins. One bracket is superimposed upon and installed on the boat transom, sides or deck. The other form, which is characterized by a shallow receptacle, is recessed into the transom or other part so that the attaching flanges remain substantially flush with the supporting surfaces.

In carrying out the inventive concept a clothespin-like clip is hingedly and detachably mounted at an upper end on an upper cross pin carried by the fixture. There is also a lower cross-pin and this is so constructed and arranged that one end of a teaser-line may be attached thereto.

These devices are preferably used at some selected point around the aft end of the vessel. The lower to the water the line is trolled, there is less the chance of the line tangling or being carried away by wind and waves. Then, too, using these devices permits a fisherman's line and rod, usually set in a holder, to be placed at the fisherman's command and promotes all around satisfactory fishing results.

Teaser-lines are usually dragged along behind vessels to attract fish. However, there has existed no place to tie the end of the teaser-line and hence fishermen resort to using all kinds of rigs, cleats, stern hardware and, under these circumstances, most teaser-lines rub against some adjacent surface and chafe and are ruined. With this invention loss of the teaser line is seldom encountered and chaffing is reduced to a minimum. Further the teaser-line may be positioned close to or into water where teaser-lines are known to work better.

Other objects, features and advantages will become more readily apparent from the following description and the accompanying drawing.

In the drawing, wherein like numerals are employed to designate like parts throughout the views:

Fig. 1 is a perspective showing one form of the invention with the teaser line attached and with the fishing line releasably engaged and with the clip in its outwardly swung usable position;

Fig. 2 is a section on the vertical line 2—2 of Figure 1 with the clip retracted or folded into the receptacle portion of the fixture or bracket;

Fig. 3 is a perspective view similar to Fig. 1 showing a modification wherein the fixture is a simple frame;

Fig. 4 is a section on an enlarged scale taken on the vertical line 4—4 of Fig. 3 with the clip swung down to its out-of-the-way position; and Fig. 5 is a perspective view similar to Fig. 1 with the device in use and wherein the attaching means for the clip is of a slightly different construction.

Reference is had first to Figs. 1, 2 and 5 wherein it will be seen that the bracket or fixture is denoted by the numeral 6. It is constructed from non-corrodible metal or suitable commercial plastics. The body portion is fashioned into a shallow vertically elongated receptacle 8 which in practice is adapted to be recessed into the transom or other part of the boat (not shown). The receptacle is open at its front and is marginally provided with an outstanding endless attaching flange 10 having holes 12 to accommodate fasteners such as screws, nails or the like (not shown). In the upper portion of the receptacle there is a horizontal cross pin 14 which is fixedly mounted. This pin is suitably spaced from the wall surfaces in the manner shown. In the lower portion of the receptacle there is also a similar horizontal cross pin 16 and this too spans the space in the receptacle so that there is sufficient clearance and room thereon to permit one end 18 of the teaser-line 20 to be attached thereto as illustrated. Thus, cross pins 14 and 16 are situated in the upper and lower portions of the receptacle in prerequisite positions and in general spaced parallelism.

The means referred to broadly as the line holding and releasing clip resembles a common "clothespin." The one in Figs. 1 and 2 is denoted by the numeral 18 while the one seen in Fig. 5 is denoted by the numeral 20. They are basically the same and are detachably hingedly mounted on the top pin 14. Each clip comprises suitable gripping jaws 22 and 24 with the parts thereof connected together in a customary manner by way of a spring 26 of the exact needed tension which serves to keep the jaws normally closed. This construction enables the desired portion of the fishing line to be releasably clamped between the jaws 22 and 24. The portion of the line from the reel is denoted by the numeral 28 and the portion leading to the bait is denoted at 30. The finger-grips or handle portions are denoted by the numerals 32 and 34. In the form seen in Fig. 1, the portion 34 is extended and formed with a hook 36 which is releasably hinged on the pin 14. In the arrangement seen in Figs. 1 and 2, a metal strip 38 is secured to the finger-piece 34 and is extended and formed into a resilient snap-hook 40 which is engaged hingedly and releasably with the pin 14. The pins 14 and 16 are sufficiently far apart, in relation to the overall length of the clip, to permit the clip to recede of fold into the receptacle as disclosed in Fig. 2.

The spring clip seen in Figs. 3 and 4 is the same as the clip 18 and is conveniently denoted by the reference character 18A. Since the clips are identical the same reference numerals which have already been employed are used in these two figures. Thus, all like parts are designated by way of like reference numerals. The only difference in these two figures is that the bracketing or fixture means is different. That is to say, the fixture comprises a simple non-corrodible metal or plastic rectangular frame which is denoted by the numeral 42 and the frame members are provided with holes 44 permitting the frame to be superimposed against the transom or other part and nailed, screwed or otherwise fastened in place. The top pin here is denoted at 46 and the bottom pin at 48 and the bottom surface is concave as at 50 for water drainage. The pin 48 is flush with the obverse surface of the fixture.

Obviously, the use of release or line clip is to be able to get an automatic drop back when a fish strikes. Also, the fisherman does not have to hold the rod. All the fisherman has to do is put the rod in the rod holder, release brake of reel, put on clicker and sit back in his chair. When the fish strikes, the line comes out of release or clip and drops back; bait stands still if fish like kings, dolphins, and bonitos haven't already picked it up and the bill fish like sailfish, swordfish, and marlin come back and pick up bait thinking they killed it. A release really hooks many fish that the would be fisherman ordinarily loses.

These stern releases function the same way as an outrigger release, only the bait instead of trolling to the side of the vessel and back of vessel distances of 75' to 100' are trolled directly behind the vessel in vessel's wake 25' to 50'. Outriggers permit bait to skip on surface of water acting like flying fish and other small bait getting away from bigger fish. My stern release holds lines low, causing bait to work more under the water than on top of water.

These stern releases may be installed anywhere in transom or in aft ends of vessels' structures. Just so one is installed where line released won't catch into anything when fish strikes or grabs bait. Preferably, a stern release should be installed in the top part of transom, either in the center or on sides. I would recommend installing three releases, one in center and one on each side. In this way when trolling four lines and a teaser on center, bait lines could be easily kept apart.

A stern release is primarily for holding what is called a flat line usually trolled from a rod and reel held by a fisherman sitting in a chair while looking for fish. The fisherman holds his rod down, and if he gets a strike or bait is grabbed he does the drop back of line by releasing reel brake, counts enough time out to permit bait to either be picked up or swallowed by fish and then sets brake. Many fish are lost this way, and surprising as it may seem, more fish come up in the wake of vessel than to the side of wake. However, because of the outrigger releases being used today, more fish are being caught on outriggers.

Stern releases have many uses. Here are some examples:

Sometimes fish rather strike a bait that trolls under water. In that case, by using stern releases, dropping baits just far enough back to keep them under water will help the fisherman to catch fish, whereas he would troll all day and come home empty handed. When the wind is blowing hard from one side of vessel, it usually carries one bait over into the other lines. Stern releases would be installed lower than outrigger releases, so would help this situation. One or two fishermen can troll as many as four or five baits when using stern releases. More fish may be caught during a day's fishing trip by using stern releases. When fishing for fish usually caught in deeper waters, stern releases may be used to good advantage. Baits may be weighted down and kept away from other bait without having to worry about tangling lines. Small outboards and utilities can troll for bill fish without outriggers by using stern releases and get as good results, if not better.

The main purpose of a fishing line release is to hold the line from fishing reel either at the end of a fishing outrigger or stern of a vessel so that the line will not run off the reel while trolling bait with reel drag set in off position, and permit fishing line to drop from holding position between gripping jaws of device when a fish strikes or grabs bait that is being trolled behind vessel at various distances from stern of vessel. The device permits a drop back which allows fish to pick up and/or swallow bait without detecting that the bait on end of fishing line is that of a fisherman.

There are different types of outrigger releases on the market today, but no stern releases of any kind. Of course, no outrigger releases presently on the market are constructed or operate like mine. The manner in which the release is constructed gives the fisherman his choice of tensions from practically nothing to pounds, without jerks, fouling up, damaging lines, etc., when fish strikes or grabs trolling bait.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing line holding and releasing device comprising an open front shallow receptacle adapted to be recessed into a stationary support member, the front portion of said receptacle having outstanding marginal attaching flanges, a horizontal pin confined and fixed in the upper portion of said receptacle, a clip having spring-biased tension released fishing line gripping and holding jaws and fingergrips for spreading and opening said jaws, one of the finger-grips of said clip having a resilient snap-hook extending well beyond the operating end of said grip and releasably and hingedly connected with said pin, and a second pin fixed in the lower portion of said receptacle and adapted to permit one end of a teaser-line to be attached thereto, said pins being spaced a predetermined distance from each other and said distance being greater than the length of the line gripping and holding the clip and permitting the clip to recede, if necessary or desired, into said receptacle without interference from said pins.

2. A line holder comprising a rectangular frame of a size, shape and material which adapts said frame to be fixedly mounted on the stern or other selective surface of a boat adjacent to the water line, said frame embodying a top member, side members and a bottom member, certain of said members having holes to accommodate fasteners employed in mounting the frame in a fixed position on said stern, a first horizontal pin joined with and spanning the space between upper portions of said side members and being spaced downwardly from the top member and located between the obverse and reverse faces of said frame members to accommodatingly support a readily attachable and releasable line holding and release device, a second horizontal pin spanning the space between lower portions of the side members and spaced upwardly from the bottom member to accommodate a teaser-line, the front of said second pin being flush with obverse faces of the adjacent frame members and spaced forwardly from the reverse faces thereof, the upper surface of the bottom frame member being concave to facilitate drainage, and a fishing line clip having spring-biased normally closed jaws adapted to grippingly but releasably hold a portion of a fishing line therebetween and to release the line when the pull tension on the line overcomes the spring closing tension imposed on the jaws, one of said finger-grips having a hook extending beyond the free end of the finger-grip and said hook being adapted to be releasably and hingedly mounted on the first horizontal pin, and distance between said first and second pins being greater than the length of the clip and hook means combined.

3. A fishing line holding and releasing device for ready attachment to the transom of a boat, said device comprising a recessed fixture having complemental side portions, a first horizontal pin fixed between said side portions and bridging the intervening space adjacent the upper portion of the recess in said fixture, a second pin similar to the first pin and also fitted between said side portions but bridging the lower part of the recess in said fixture, and a fishing line release comprising a clip having spring-biased normally closed jaws and finger-grips for spreading and retaining said jaws in an open position, one of said finger-grips having hook means hingedly mounted on said first horizontal pin, said clip being swingable toward and from said fixture and receding in whole or in part in the recess in the fixture when it is not in use.

4. The structure defined in claim 3, and wherein said fixture comprises a frame adapted to be superimposed upon its mounting surface, said pins being positioned within the surrounding marginal limits of the frame and spaced from the front and back surfaces of said side portions, the distance between said pins being predetermined so that the intervening space is thus adapted to permit a spring-biased jaw-equipped readily attachable and detachable line release to be aptly fitted therein, one of said pins being adapted to facilitate mounting of the line release and the other pin being adapted to accommodate an attachable teaser-line.

5. The structure defined in claim 3, and wherein said fixture comprises a shallow receptacle within which the pins are mounted and confined and an outstanding marginal attaching flange, said receptacle being adapted to be seated accommodatingly in a recess provided therefor in an exterior surface of the stern or an equivalent stationary part of said boat and said flange being adapted to be removably attached to the stern by fasteners which are cooperable with fastener holes provided therefor in said flange.

6. A line holder comprising a rectangular frame adapted to be fixedly mounted on the stern of a vessel, said frame being of prerequisite cross-sectional thickness, said frame having side members and top and bottom members, certain of said members having holes for passage of fasteners employed in securing the frame on said stern, a first horizontal pin joined with and spanning the space between upper portions of the side members of said frame and being spaced downwardly from the top frame member and located in a plane between the plane of the obverse and reverse faces of said frame members to accommodatingly support a readily attachable and releasable line holding and release device, a second horizontal pin spanning the space between lower portions of the side members and spaced upwardly from the lower frame member to accommodate a teaser-line, the front of said second pin being flush with obverse faces of the adjacent frame members and spaced forwardly from the reverse faces thereof, the exteriorly facing surface of the lower frame member being concave to facilitate drainage.

References Cited in the file of this patent

UNITED STATES PATENTS

| | | |
|---|---|---|
| 1,683,049 | Penley | Sept. 4, 1928 |
| 2,595,752 | Batts | May 6, 1952 |

FOREIGN PATENTS

| | | |
|---|---|---|
| 220,713 | Switzerland | July 16, 1942 |